US 6,618,097 B1

(12) United States Patent
Yamada (10) Patent No.: US 6,618,097 B1
(45) Date of Patent: Sep. 9, 2003

(54) IMAGE DISPLAY APPARATUS AND CONTOUR DETECTING CIRCUIT PROVIDED THEREIN

(75) Inventor: Yukimitsu Yamada, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/636,245

(22) Filed: Aug. 10, 2000

(30) Foreign Application Priority Data

Aug. 10, 1999 (JP) .......................................... 11-226620
Apr. 12, 2000 (JP) ...................................... 2000-115893

(51) Int. Cl.⁷ .............................. H04N 5/68; G06K 9/36
(52) U.S. Cl. ........................ 348/625; 348/26; 348/627; 382/266
(58) Field of Search ........................ 348/26, 625, 630, 348/571, 252, 253, 627, 628, 629; 382/266, 316, 172, 283–284, 232, 267, 268, 269

(56) References Cited

U.S. PATENT DOCUMENTS

| | | | | |
|---|---|---|---|---|
| 4,644,583 A | * | 2/1987 | Watanabe et al. ........... | 382/199 |
| 4,980,755 A | * | 12/1990 | Ozaki ......................... | 348/628 |
| 5,036,401 A | * | 7/1991 | Antonov et al. .............. | 348/26 |
| 5,091,967 A | * | 2/1992 | Ohsawa ....................... | 382/172 |
| 5,237,625 A | * | 8/1993 | Yamashita et al. .......... | 382/266 |
| 5,329,316 A | * | 7/1994 | Kang ........................... | 348/625 |
| 5,469,225 A | * | 11/1995 | Hong ........................... | 348/625 |
| 5,905,532 A | * | 5/1999 | Ito et al. ...................... | 348/253 |
| 5,959,694 A | * | 9/1999 | Ito et al. ...................... | 348/625 |
| 6,009,200 A | * | 12/1999 | Fujita et al. ................. | 382/232 |
| 6,124,890 A | * | 9/2000 | Muramoto .................... | 348/345 |

FOREIGN PATENT DOCUMENTS

| JP | 4-38077 | 2/1992 |
|---|---|---|
| JP | 6-46293 | 2/1994 |

* cited by examiner

Primary Examiner—John Miller
Assistant Examiner—Paulos Natnael
(74) Attorney, Agent, or Firm—Brinks Hofer Gilson & Lione (57) ABSTRACT

A contour detecting circuit includes a first differentiating circuit which outputs a signal (first-differentiated value) obtained by first-differentiating an input video signal, a second differentiating circuit which outputs a signal (second-differentiated value) obtained by second-differentiating the first-differentiated signal, a detection-computing circuit which detects the degree of a change in the input video signal from the first-differentiated signal by using a signal obtained by first-differentiating a signal adjacent to the first-differentiated signal, and a determining-and-controlling circuit which determines and controls a steep-contour generating process by comparing a value as the computation result in the detection-computing circuit with an externally set threshold value.

12 Claims, 9 Drawing Sheets

IMAGE DISPLAY APPARATUS AND CONTOUR DETECTING CIRCUIT PROVIDED THEREIN

BACKGROUND OF THE INVENTION

1. Field of the Invention

The present invention relates to an image processing apparatus having a function of increasing picture quality, and to a circuit for detecting the contour of the waveform of a picture signal input to an image display apparatus such as a liquid crystal device or a cathode-ray tube.

2. Description of the Related Art

Conventional image display apparatuses that treat a picture signal perform a steep-contour generating process in which, when an input picture signal has insufficient high-frequency-range characteristics, a high frequency component, extracted from the input picture signal, is added to the original picture signal, and the picture signal to which the extracted high frequency component is added is processed so that the rise and fall of its contour is steep.

This conventional steep-contour generating process is described below with reference to the circuit shown in FIG. 10.

Figure 10:
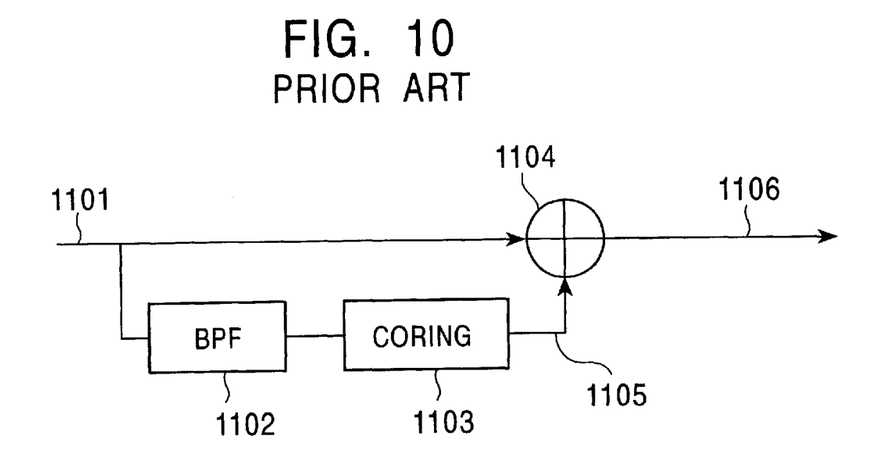
FIG. 10 is a circuit diagram showing a steep-contour generating circuit.

The circuit in FIG. 10 includes a band-pass filter (BPF) 1102 which extracts and outputs a high frequency component (contour component) of a video signal (luminance signal) 1101, a coring 1103 for outputting a processed signal in accordance with the level of the high frequency component extracted by the BPF 1102, and an adder 1104 for outputting the sum of the original video signal 1101 and the processed signal input from the coring 1103.

Figure 11A:
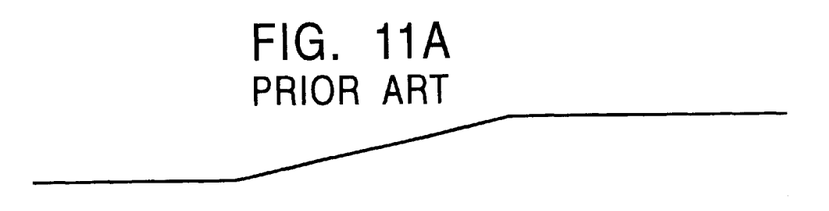
FIGS. 11A, 11B, and 11C are waveform charts illustrating an operation of the steep-contour generating circuit shown in FIG. 10.
Figure 11B:
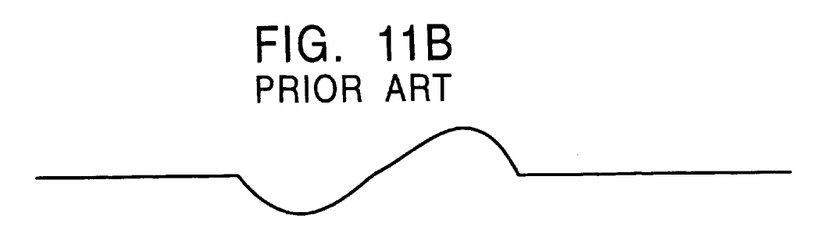
Figure 11C:
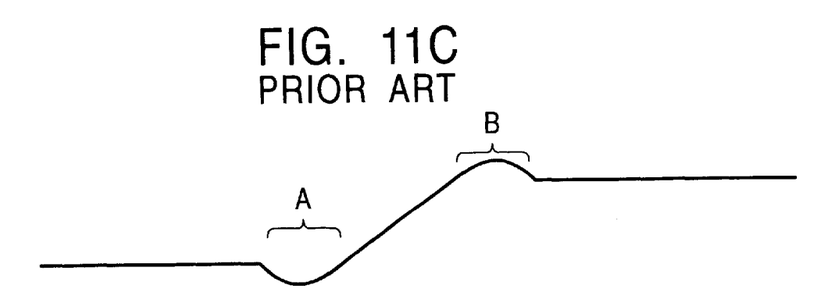

The waveforms of the signals 1101, 1105, and 1106 are shown in FIGS. 11A, 11B, and 11C, respectively.

Referring to Fig. 11C, the waveform of the sum signal 1106 is obtained by identically adding the processed signal 1105 from the coring 1103 to all the data of the original video signal 1101, regardless of the positions of waveform edges of the input video signal 1101. Thus, in the waveform of the sum signal 1106, an undershoot occurs at a portion A, and an overshoot occurs at a portion B. Therefore, the sum signal 1106 generates an image looking glaring, and may cause deterioration in the image quality.

SUMMARY OF THE INVENTION

Accordingly, it is an object of the present invention to provide a contour detecting circuit for detecting the contour of the waveform of an input video signal.

It is another object of the present invention to provide an image display apparatus for performing preferable contour correction without causing deterioration in image quality by eliminating an undershoot and an overshoot in a waveform obtained by a steep-contour generating process.

To these ends, according to an aspect of the present invention, the foregoing objects are achieved through provision of an image display apparatus including a second differentiating circuit for computing a second-differentiated value based on an input video signal, a determining circuit for detecting timing with which the polarity of the second-differentiated value obtained by the second differentiating circuit is inverted, and a computing circuit for performing a steep-contour generating process on an input video signal corresponding to the timing detected by the determining circuit so that the contour of the input video signal is steep.

According to another aspect of the present invention, the foregoing objects are achieved through provision of an image display apparatus including a first differentiating circuit for computing a first-differentiated value based on an input video signal, a second differentiating circuit for computing a second-differentiated value based on the input video signal, a detection-computing circuit for obtaining the degree of a change in the input video signal with predetermined timing from a first-differentiated value based on an input video signal with the predetermined timing and a first-differentiated value based on at least one of input video signals adjacent to the input video signal with the predetermined timing, a determining circuit for detecting timing with which the polarity of the second-differentiated value in the second differentiating circuit is inverted, and for determining, by referring to the computation result by the detection-computing circuit, which corresponds to the predetermined timing, a contour of the input video signal to be processed by a steep-contour generating process, and a computing circuit for performing, based on the determination result by the determining circuit, the steep-contour generating process on the input video signal.

According to a further aspect of the present invention, the foregoing objects are achieved through provision of a contour detecting circuit including a first differentiating circuit for computing a first-differentiated value based on an input video signal, a second differentiating circuit for computing a second-differentiated value based on the input video signal, a detection-computing circuit for obtaining the degree of a change in the input video signal with predetermined timing from a first-differentiated value based on the input video signal with the predetermined timing and a first-differentiated value based on at least one of input video signals adjacent to the input video signal with the predetermined timing, and a determining circuit for detecting timing with which the polarity of the second-differentiated value by the second differentiating circuit is inverted, and for determining, by referring to the computation result by the detection-computing circuit, which corresponds to the predetermined timing, a contour of the input video signal.

According to the present invention, the degree of a change in an input video signal can be found without being affected by an amplitude component of the input video signal. This is preferable in that only a change in the desired frequency component is found.

According to the present invention, the structure of a detection-computing circuit can be simplified.

According to the present invention, an image obtained by performing a steep-contour generating process can be adapted for a change in adjacent video signals, whereby the image is smoothed.

According to the present invention, a steep-contour generating process in a region which requires no contour correction is prevented from being performed. This enables preferable contour correction without causing deterioration in image quality by eliminating an undershoot and an overshoot in a waveform obtained by the steep-contour generating process, so that the processed image can be natural.

DESCRIPTION OF THE PREFERRED EMBODIMENTS

Figure 1:
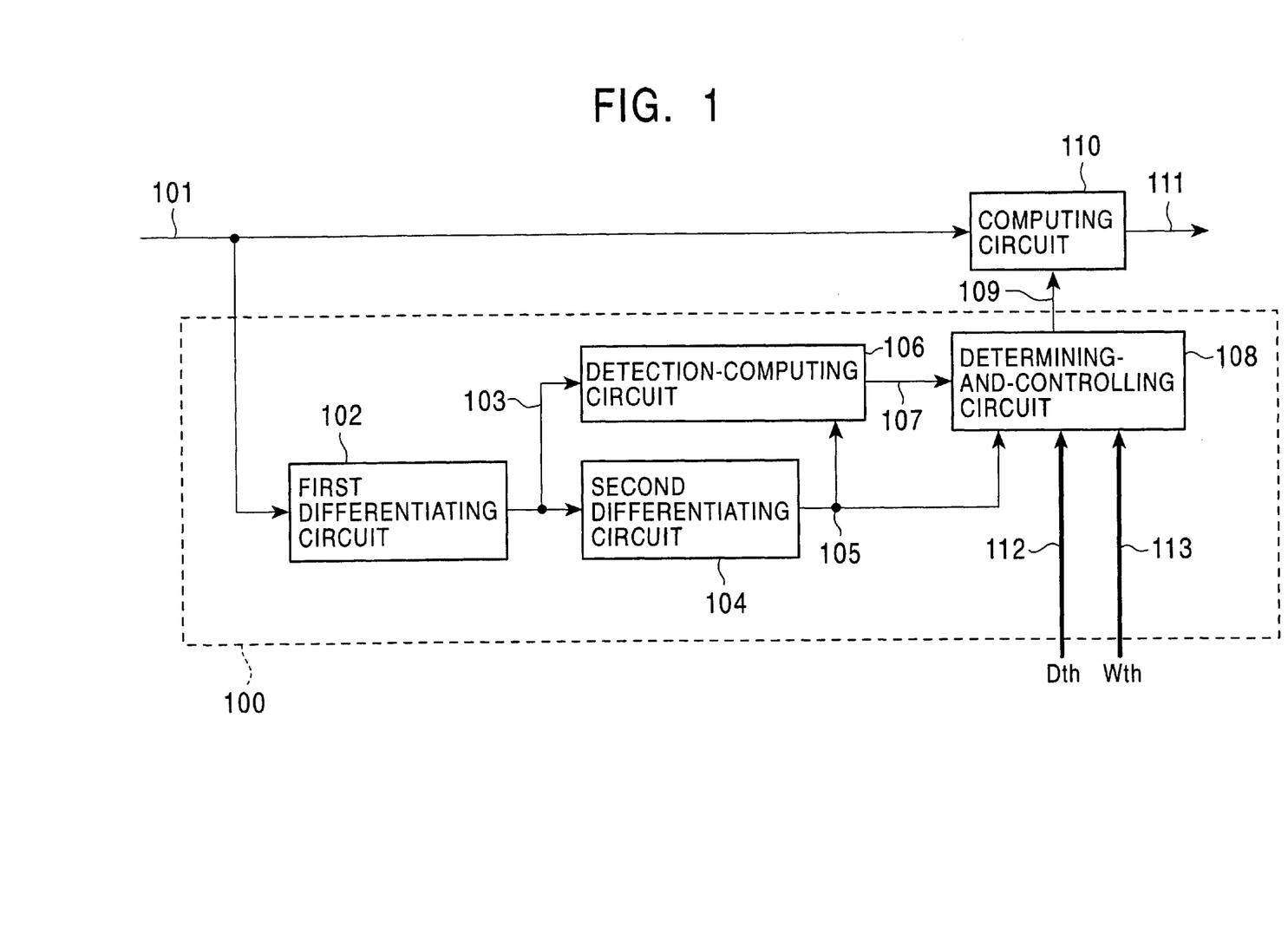
FIG. 1 is a block diagram showing an image display apparatus according to a first embodiment of the present invention.

With reference to the accompanying drawings, a contour detecting circuit and an image display apparatus, according to a first embodiment of the present invention, are described below. FIG. 1 is a block diagram of the first embodiment of the present invention, and shows the case where data of an input video signal represent luminance.

In FIG. 1, a contour detecting circuit 100 includes a first differentiating circuit 102 which outputs a signal (hereinafter referred to also as a "first-differentiated value") 103 obtained by first-differentiating an input video signal 101, a second differentiating circuit 104 which outputs a signal (hereinafter referred to also as a "second-differentiated value") 105 obtained by second-differentiating the first-differentiated signal 103, a detection-computing circuit 106 which detects the degree of a change in the input video signal 101 from the first-differentiated signal 103 by using a signal obtained by first-differentiating an adjacent signal, and a determining-and-controlling circuit 108 which determines and controls a steep-contour generating process by comparing a value 107 as the computation result in the detection-computing circuit 106 with externally set threshold value $D_{th}$ (112). A computing circuit 110 performs, based on a control signal 109 from the determining-and-controlling circuit 108, the steep-contour generating process on the input video signal 101. The computing circuit 110 outputs a video signal 111. Value $W_{th}$ for setting the number of times the steep-contour generating process is performed is input to the determining-and-controlling circuit 108. Value $W_{th}$ is also used to designate the length of a contour to be detected. A value obtained by adding one to value $W_{th}$ is used as the length of a contour on which the steep-contour generating process is performed.

Figure 2:
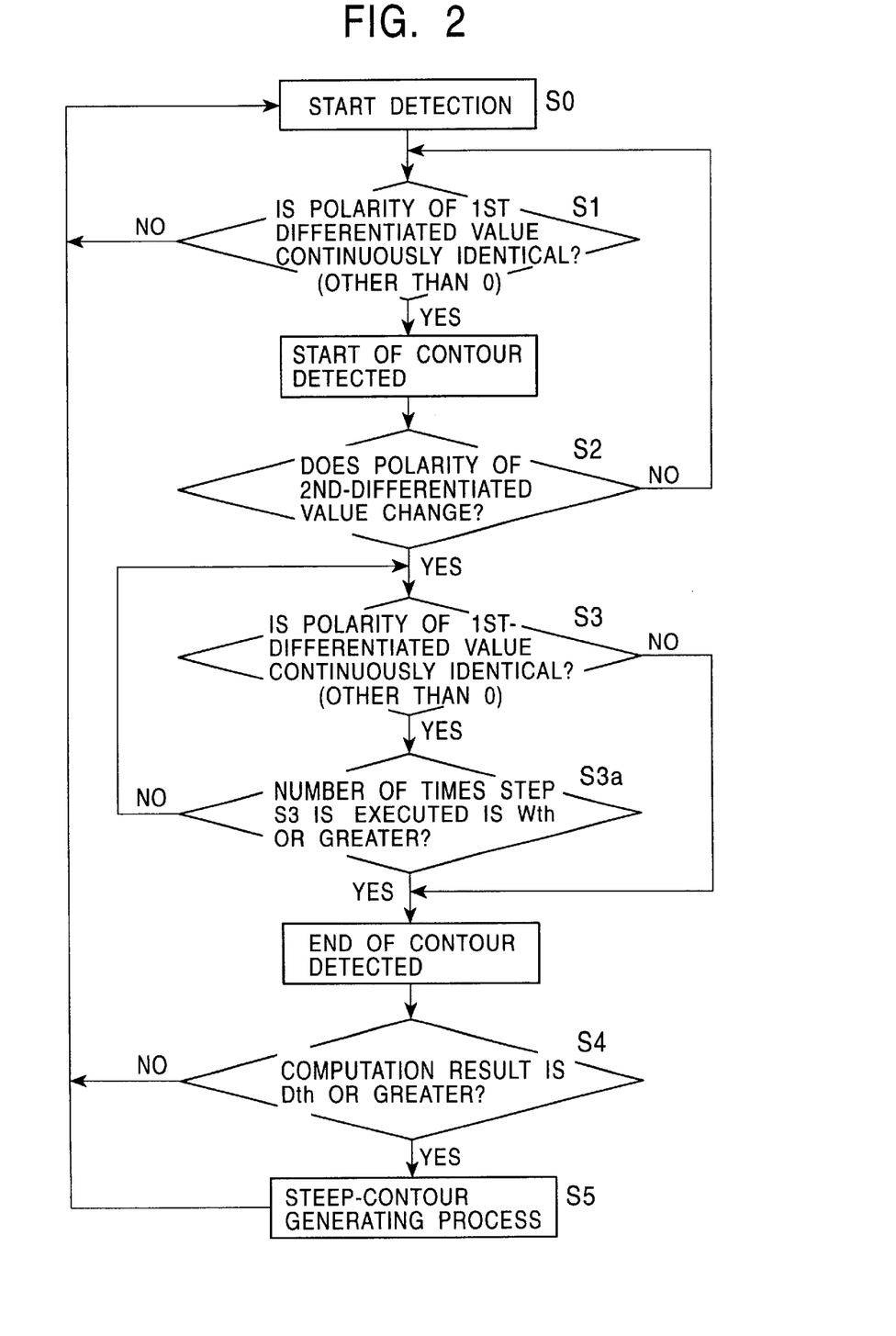
FIG. 2 is a flowchart showing the operation sequence of the information processing apparatus shown in FIG. 1.

FIG. 2 shows the operation sequence of the determining-and-controlling circuit 108 in the image display apparatus shown in FIG. 1. With reference to FIG. 2, the operation process of the determining-and-controlling circuit 108 is described below.

The process starts at step S0. In step S1, by referring to the value 107 output by the detection-computing circuit 106, the process determines whether the polarity of a first-differentiated value of successive image data is continuously identical. When the condition in step S1 is satisfied, the process determines that the start of the contour is detected. The process proceeds to step S2. When the condition in step S1 is not satisfied, the process proceeds back to step S0.

In step S2, the process determines, based on the signal output by the second differentiating circuit 104, whether the polarity of a second-differentiated value of the image data is switched from the time the start of the contour is detected. When the condition in step S2 is satisfied, the process proceeds to step S3. When the condition in step S2 is not satisfied, the process proceeds back to step S1.

In step S3, by referring to the value 107 output by the detection-computing circuit 106, the process determines whether the polarity of the first-differentiated value changes. When the polarity of the first-differentiated value changes, the process determines that the end of the contour has been detected, and the process proceeds to step S4. When the polarity of the first-differentiated value does not change, the same processing is continuously performed in step S3. In step S3a, when the number of times the processing in step S3 is performed exceeds externally set threshold value $W_{th}$, the process forcibly proceeds to step S4.

In step S4, within a range between the detected start and the detected end of the contour, the result of computation performed by the detection-computing circuit 106 is compared with externally set threshold value $D_{th}$, using, as a reference, a point at which the polarity of the second-differentiated value changes. When the computation result is greater than the threshold value $D_{th}$, the process proceeds to step S5. When the computation result is less than the threshold value $D_{th}$, the process proceeds back to step S0.

In step S5, in the range between the detected start and the detected end of the contour, the contour is processed to be steep. After step S5, the process proceeds back to step S0.

As described above, according to the contour detecting circuit 100 of the present invention, timing with which the second-differentiated value based on the input video signal 101 is inverted is detected, and the computation result from the detection-computing circuit 106, which corresponds to the timing, is used to perform the steep-contour generating process.

Figure 3:
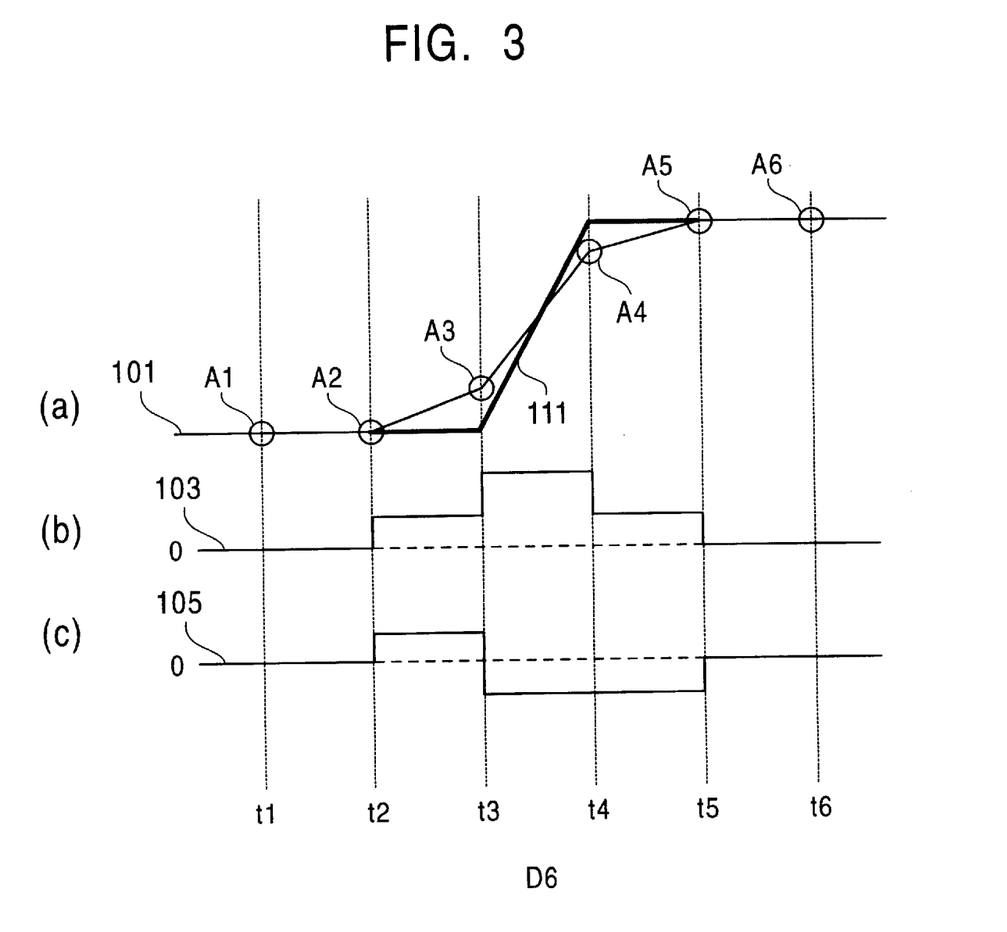
FIG. 3 is a signal-waveform chart illustrating an operation of a steep-contour generating process performed by the image display apparatus shown in FIG. 1.

FIG. 3 shows waveforms illustrating a steep-contour generating operation performed in accordance with the sequence shown in FIG. 2 by the image display apparatus. FIG. 3 includes the waveform of the input video signal 101, data A1 to A6 at time t1 to time t6 in the input video signal 101, the signal 103 representing the first-differentiated value, which corresponds to the input video signal 101, and the waveform of the signal 105 at time t1 to t6 which represents the second-differentiated value corresponding to the input video signal 101. Data of the input video signal 101 before time t1 have values identical to the data A1, and data of the input video signal 101 after time t6 have values identical to the data A6. In the input video signal 101, a change between the data A3 and A4 is larger than a change between other data.

When the data A1 is input, the output of the first differentiating circuit 102 is zero. Accordingly, the condition in step S1 is not satisfied in the detection-computing circuit 106. Thus, step S0 is activated.

When the data A2 is input, the value 103 output by the first differentiating circuit 102 becomes positive discontinuously. Accordingly, the condition in step S1 is not satisfied in the determining-and-controlling circuit 108, and step S0 is activated.

When the data A3 is input, the polarity of the value 103 output from the first differentiating circuit 102 becomes positive. Accordingly, the condition in step S1 is satisfied in the determining-and-controlling circuit 108, and the process proceeds to step S2. The data A2, at which the first-differentiated value having the same polarity begins, is recognized as the start of the contour. In step S2, the polarity of the signal 105 representing the second-differentiated value is inverted. This satisfies the condition in step S2, and the process proceeds to step S3.

When the data A4 is input, the polarity of the value 103 output by the first differentiating circuit 102 becomes positive, and the value 103 continuously has the same polarity. Accordingly, the condition in step S3 is not satisfied, and step S3 is kept activated.

When the data A5 is input, the value 103 output by the first differentiating circuit 102 becomes zero, and the determining-and-controlling circuit 108 determines that the number of times the same polarity of the first-differentiated value is successively detected is not less than a set value $W_{th}$ of 3. Accordingly, the condition in step S3 is satisfied, and the process proceeds to step S4. The data A5 is recognized as the end of the contour.

In step S4, the result of the computation by the detection-computing circuit 106 is compared with the threshold value $D_{th}$. From the first-differentiated value between the data A2, which is recognized as the start of the contour, and the data A5, which is recognized the end of the contour, division is performed.

The division is performed using values obtained by first-differentiating the data A2 and A4 as divisors, and a value obtained by first-differentiating the data A3 as a dividend, in accordance with the following expression (1):

$$\{(\text{Value obtained by first-differentiating the data A3})/(\text{Value obtained by first-differentiating the data A2})+(\text{Value obtained by first-differentiating the data A3})/(\text{Value obtained by first-differentiating the data A4})\} \quad (1)$$

When the result of the above-described computation is greater than the threshold value $D_{th}$, the process proceeds to step S5.

In step S5, the computing circuit 110 performs the steep-contour generation process on the data A2, which is recognized as the start of the contour, to the data A5, which is recognized as the data A5.

In computation for the steep-contour generation process, the data A3, at which the polarity of the second-differentiated value 105 based on the input video signal 101 is inverted, is processed to be identical to the data A2, which is recognized as the start of the contour, and the data transmitter A4, which is recognized as the end of the contour, is processed to be identical to the data transmitter A5.

As the waveform of the signal on which the steep-contour generating process is performed, the data of the contour start and the data of the contour end are used without being changed, as indicated by the bold line 111 as the waveform (a) shown in FIG. 3.

Next, the operation process of the image display apparatus when it does not perform the steep-contour generating process is described below with reference to FIG. 4.

Figure 4:
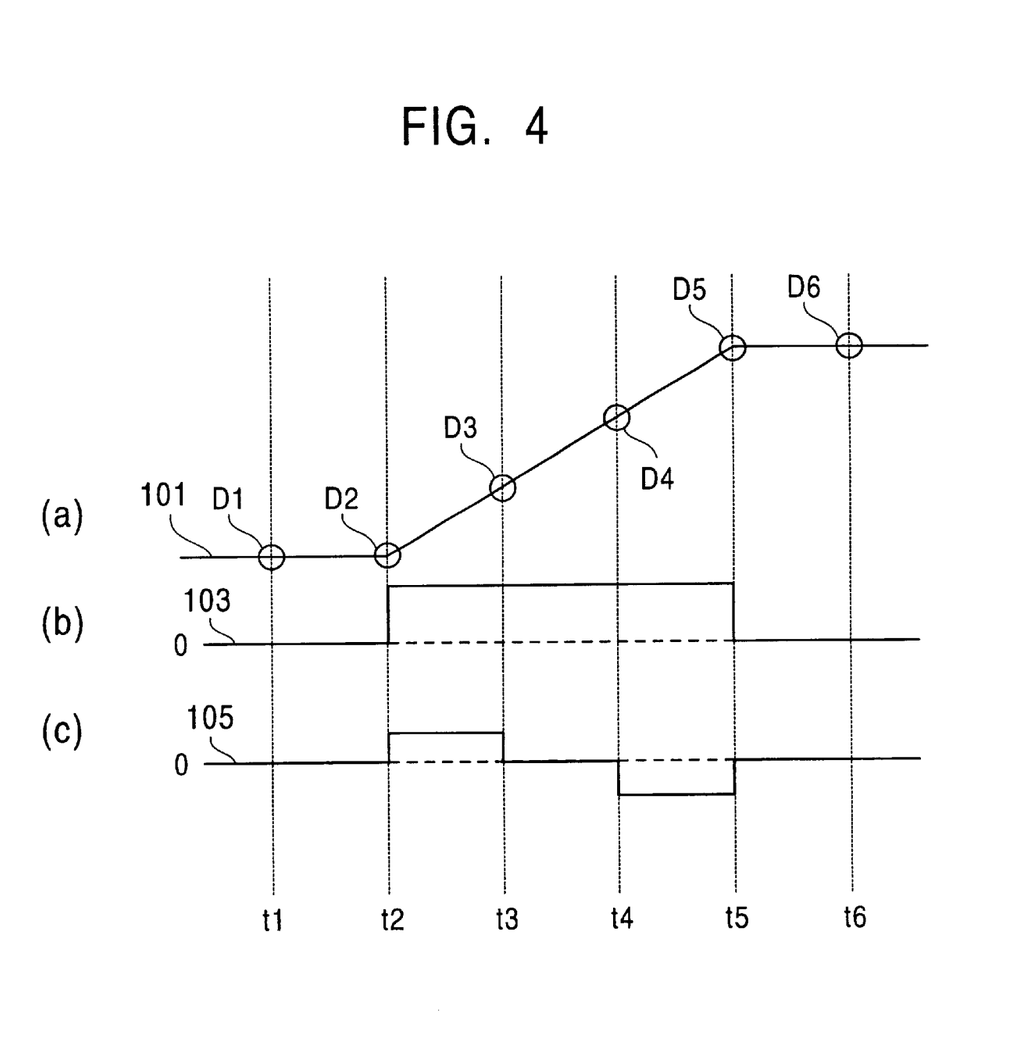
FIG. 4 is a signal-waveform chart illustrating another operation of the steep-contour generating process performed by the image display apparatus shown in FIG. 1.

FIG. 4 shows a waveform (a) corresponding to the input video signal 101, data D1 to D6 of the input video signal 101, a waveform (b) indicating the first-differentiated value 103, and a waveform (c) indicating the second-differentiated value 105. It is assumed that data of the input video signal 101 before the data D1 are identical to the data D1, and it is also assumed that data of the input video signal 101 after the data D6 are identical to the data D6. The waveform (a) of the input video signal 101 in FIG. 4 has a monotonic change compared with the waveform (a) of the input video signal 101.

When the data D1 is input, the output of the first differentiating circuit 102 is zero. Accordingly, the condition in step Si is not satisfied in the determining-and-controlling circuit 108. This activates step S0.

When the data D2 is input, the first-differentiated value 103 output by the first differentiating circuit 102 has a discontinuous positive polarity. Accordingly, the condition in step S1 is not satisfied, which activates step S0.

When the data D3 is input, the first-differentiated value 103 output by the first differentiating circuit 102 has a positive polarity. Accordingly, the condition in step S1 is satisfied in the determining-and-controlling circuit 108, and the process proceeds to step S2. The data D2, at which the first-differentiated value having the same polarity begins, is recognized as the start of the contour. In step S2, the polarity of the second-differentiated value 105, output from the determining-and-controlling circuit 108, changes from positive to zero. Accordingly, the condition in step S2 is not satisfied, and the process proceeds back to step S1.

Even when the data after the data D4 are input, the condition in step S2 is not satisfied because they have a monotonic change in the waveform. Thus, the steep-contour generating process on the waveform (a) shown in FIG. 4 is not performed.

As described above, the contour detecting circuit 100 detects the timing when the polarity of the second-differentiated value 105 based on the input video signal 101 is inverted, and performs the steep-contour generating process on the video signal 101 with the timing, whereby a portion of the contour to be corrected can be detected and only the detected portion is processed to be steep. This prevents the steep-contour generating process on a region in which correction of the contour is not required.

Therefore, in a waveform obtained after the steep-contour generating process is performed, an undershoot and an overshoot are prevented from occurring. Accordingly, the contour can be preferably corrected without any image quality deterioration.

In addition, the image display apparatus can securely detect the contour of a waveform which must be processed to be steep, and can perform a steep-contour generating process adapted for the state of the waveform.

In the image display apparatus according to the first embodiment (shown in FIG. 1), the detection-computing circuit 106 may be eliminated and a simplified steep-contour generating process can be performed using a point at which the polarity of the second-differentiated value 105 is inverted, as a reference.

In the first embodiment, the computation by the determining-and-controlling circuit 106 is performed using the values obtained by first-differentiating the data A2 and A4 as divisors, and the value obtained by first-differentiating the data A3 as a dividend. However, the data A3 may be used as a divisor, and the data A2 and A4 may be used as dividends.

The computation by the determining-and-controlling circuit 106 may be performed using the values obtained by first-differentiating the data A2 and A4 as subtrahends, and the data A3 as a minuend, in accordance with the following expression (2):

$$\{(\text{Value obtained by first-differentiating the data A3})-(\text{Value obtained by first-differentiating the data A2})\}+\{(\text{Value obtained}$$

by first-differentiating the data A3)−(Value obtained by first-
differentiating the data A4)} (2)

In addition, subtraction using the data A3 as a subtrahend, and the data A2 and A4 as minuends, may be used.

Figure 5:
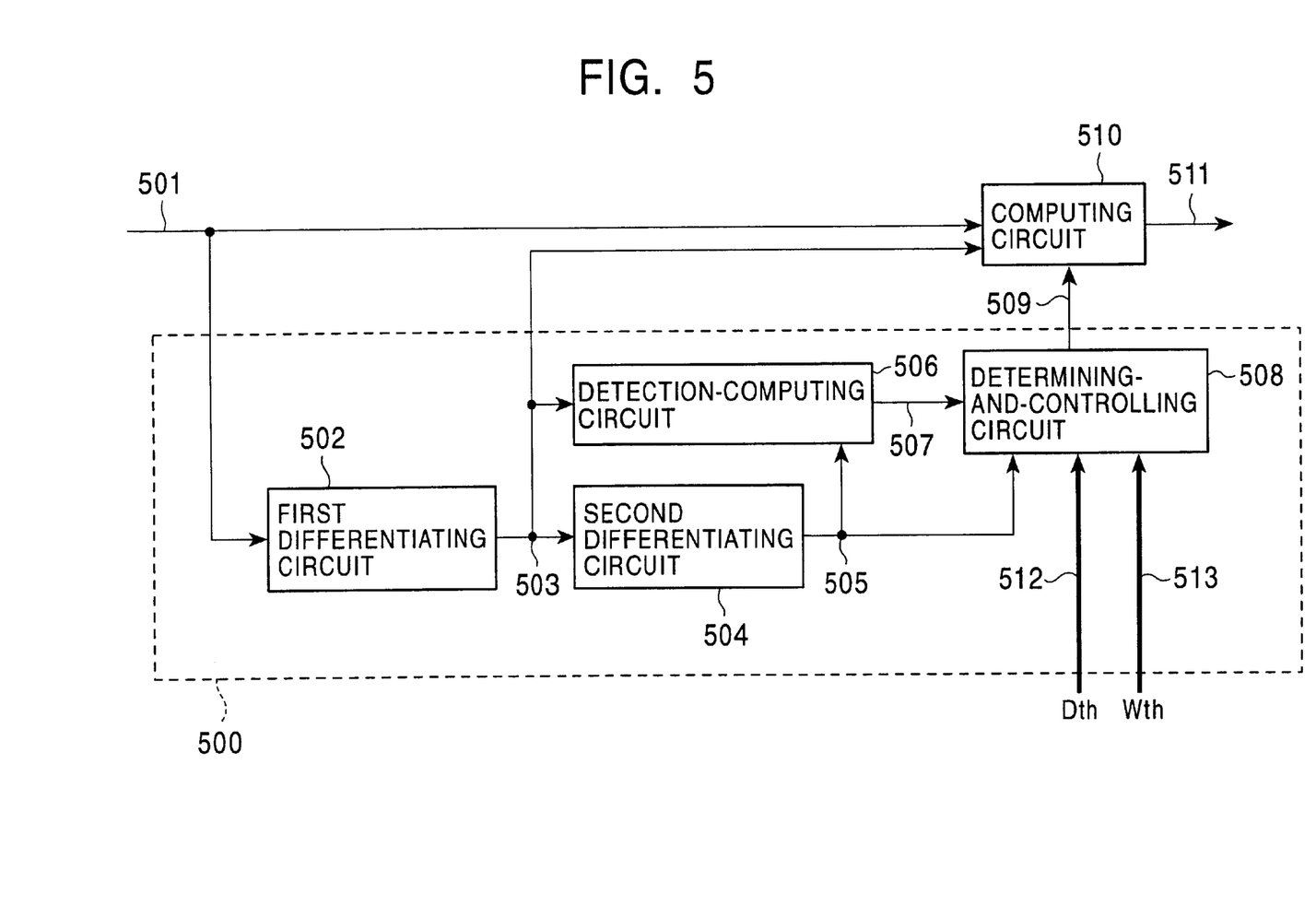
FIG. 5 is a block diagram showing an information processing apparatus according to a second embodiment of the present invention.

FIG. 5 shows a contour detecting circuit and an image display apparatus, according to a second embodiment of the present invention. Data of an input video signal 501 represent luminance. The second embodiment differs from the above-described first embodiment in that the method of computation for the steep-contour generating process is adapted for changes in adjacent data. In the first embodiment, the data of the contour start and the data of the contour end are used without being changed.

In FIG. 5, a contour detecting circuit 500 includes a first differentiating circuit 502 which outputs a signal (hereinafter referred to as a "first-differentiated value") 503 obtained by first-differentiating an input video signal 501, a second differentiating circuit 504 which outputs a signal (hereinafter referred to as a "second-differentiated value") 505 obtained by second-differentiating the first-differentiated signal 503, a detection-computing circuit 506 which detects the degree of a change in the input video signal 501 from the first-differentiated signal 503 by using a signal obtained by first-differentiating a signal adjacent to the first-differentiated signal 503, and a determining-and-controlling circuit 508 which determines and controls a steep-contour generating process by comparing a value 507 as the computation result in the detection-computing circuit 506 with externally set threshold value $D_{th}$ (512).

The determining-and-controlling circuit 508 operates similarly to the determining-and-controlling circuit 108 in the first embodiment. A computing circuit 510 performs, based on a control signal 509 from the determining-and-controlling circuit 508, a steep-contour generating process on the input video signal 501. The computing circuit 510 outputs a video signal 511. Threshold value $D_{th}$ (512) used as a reference for determination of whether the steep-contour generating process is performed, and set value $W_{th}$ (513) for determining the width of a waveform to be detected in the steep-contour generating process, are input to the determining-and-controlling circuit 508.

Figure 6:
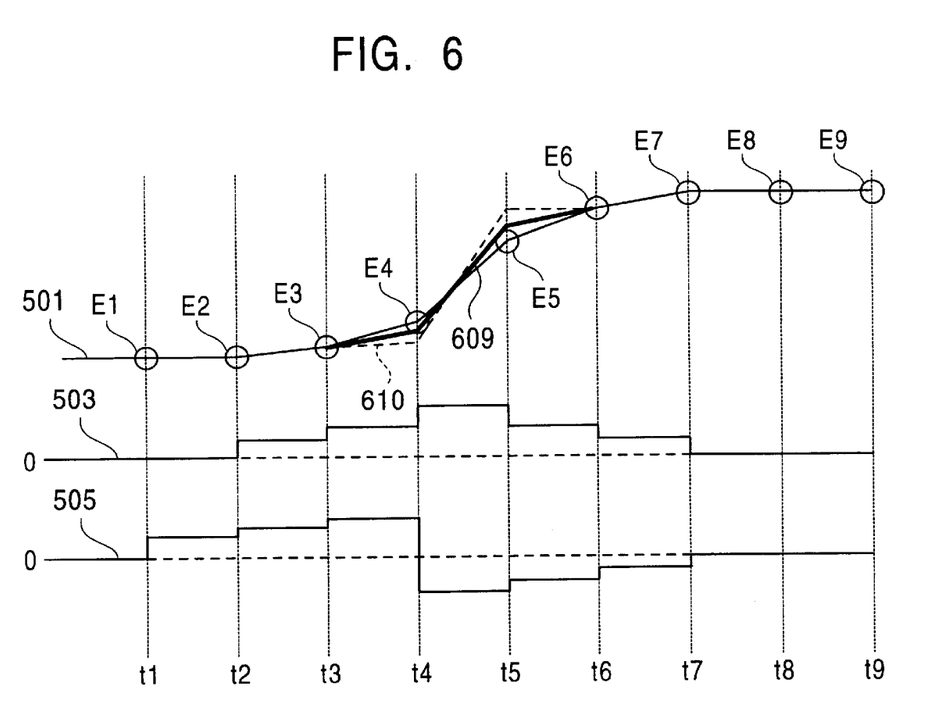
FIG. 6 is a signal-waveform chart illustrating an operation of a steep-contour generating process performed by the image display apparatus shown in FIG. 5.

FIG. 6 shows waveforms illustrating the operation of the image display apparatus when it performs the steep-contour generating process in accordance with the sequence shown in FIG. 2. FIG. 6 includes the waveform of the input video signal 501, data E1 to E9 of the input video signal 501 at time t1 to time t9, the first-differentiated value 503 based on the input video signal 501, and the waveform of the second-differentiated value 503 at time t1 to time t9. It is assumed that data of the input video signal 501 before time t1 are identical to the data E1. It is also assumed that data of the input video signal 501 after time t9 are identical to the data E9. The input video signal 501 has a larger change in its waveform between the data E4 and the data E5 than between other data. Here, value $W_{th}$ is set at 2.

When the data E1 is input, the output of the first differentiating circuit 502 is zero. Accordingly, the condition in step S1 is not satisfied, and step S0 is activated.

When the data E2 is input, the data 503 output from the first differentiating circuit 502 has a discontinuous positive polarity. Thus, the condition in step S1 is not satisfied in the determining-and-controlling circuit 108, and step S0 is activated.

When the data E3 is input, the data 503 output from the first differentiating circuit 502 has a positive polarity. Accordingly, the condition in step S1 is satisfied in the determining-and-controlling circuit 108, the process proceeds to step S2. The data E2 at which the first-differentiated value 503 having the same polarity begins is recognized as the start of the contour. Since, in step S2, the polarity of the second-differentiated value 505 remains to be positive, and the condition in step S2 is not satisfied, the process proceeds to step S1.

When the data E4 is input, the data 503 output from the first differentiating circuit 502 has a positive polarity, and the condition in step S1 is not satisfied in the determining-and-controlling circuit 508. Accordingly, the process proceeds to step S2. In step S2, the polarity of the second-differentiated value 505 changes from positive to negative. Thus, the condition in step S2 is not satisfied, and the process proceeds to step S3.

When the data E5 is input, the data 503 output from the first differentiating circuit 502 has a positive polarity. Accordingly, the condition S3 in satisfied in the determining-and-controlling circuit 508, but the condition S3a is not satisfied. Thus, the condition in S3 is still effective.

When the data E6 is input, the data 503 output from the first differentiating circuit 502 has a positive polarity. Accordingly, the condition in step S3 is not satisfied. However, the process forcibly proceeds to step S4 since value $W_{th}$ is set at 2.

In this case, the end of the contour is set to correspond to the data E6, and the length of the contour is set at 3 obtaining by adding 1 to value $W_{th}$. Accordingly, the start of the contour is changed to correspond to the data E3 from the data E2.

In step S4 of the sequence by the determining-and-controlling circuit 508, the detection-computing circuit 506 performs detecting computation on the first-differentiated value 503 based on a range between the data E3, which is recognized as the start of the contour, and the data E6, which is recognized as the end of the contour, and compares the computation result with threshold value $D_{th}$. The detecting computation is performed identically to that in the first embodiment. When the computation result is greater than externally set threshold value $D_{th}$, the process proceeds to step S5.

In step S5, the computing circuit 510 performs the steep-contour generating process on the range between the data E3, which is recognized as the start of the contour, and the data E6, which is recognized as the end of the contour.

When the steep-contour generating process is performed, data recognized as the start and end of the contour are used without being changed. The data E4 is computed using a value obtained by first-differentiating data temporally prior to the start of the contour, as shown in the following expression (3), and a first-differentiated value on the end of the contour, as shown in the following expression (4).

(Data obtained by processing the data E4)=(Data E3)+(Value
obtained by first-differentiating the data E2) (3)

(Data obtained by processing the data E5)=(Data E6)−(Value
obtained by first-differentiating the data E6) (4)

The computation result is indicated by the bold line 609 shown in FIG. 6. For comparison, the result obtained by the same processing method in the first embodiment is indicated by the dotted line 610 shown in FIG. 6. By comparing these two waveforms, and using a first-differentiated value based on data adjacent to a contour which is processed to be steep, a waveform obtained after the steep-contour generating process is performed is controlled to be adapted for luminance change adjacent to the contour. Therefore, natural and sharp steep-contour generating processing is possible. A range in which the processing is performed can be changed in accordance with the type of image. In the second embodiment, simple first differentiation is used. However, by changing a first-differentiated value for use, the degree of steep-contour generation can be controlled, and the steep-contour generating process can be performed to be adapted for various image states.

A third embodiment of the present invention is described below. In the third embodiment, the present invention is applied to a case where an input video signal is converted into a signal having a resolution higher than that of the input video signal.

Figure 7:
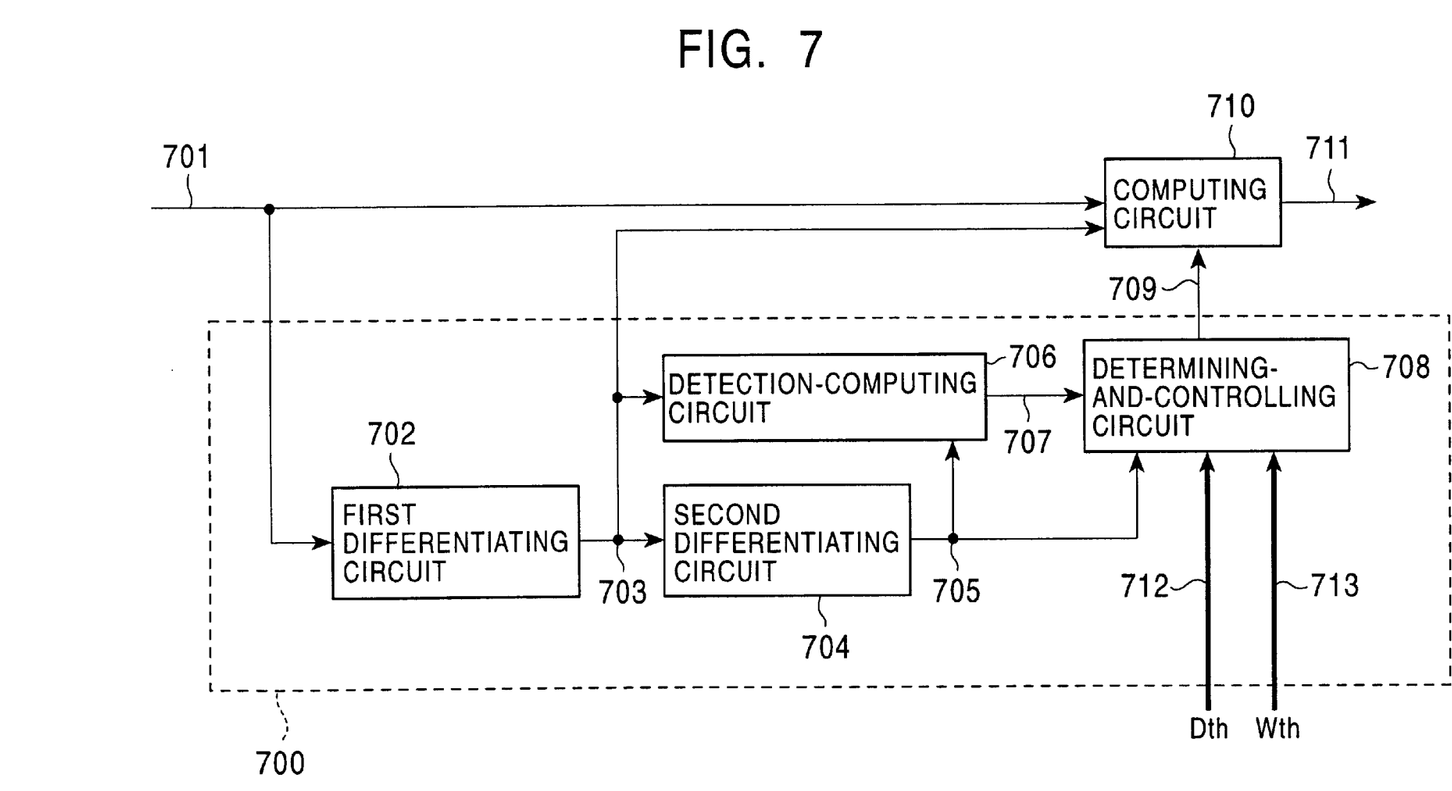
FIG. 7 is a block diagram showing an image display apparatus according to a third embodiment of the present invention.

FIG. 7 shows a contour detecting circuit and an image display apparatus, according to the third embodiment, in which the data of the input video signal represent luminance.

In FIG. 7, a contour detecting circuit 700 includes a first differentiating circuit 702 which outputs a signal (hereinafter referred to as a "first-differentiated value") 703 obtained by first-differentiating an input video signal 701, a second differentiating circuit 704 which outputs a signal (hereinafter referred to as a "second-differentiated value") 707 obtained by second-differentiating the first-differentiated signal 703, a detection-computing circuit 706 which detects the degree of a change in the input video signal 701 from the first-differentiated signal 703 by using a signal obtained by first-differentiating a signal adjacent to the first-differentiated signal 703, and a determining-and-controlling circuit 708 which determines and controls a steep-contour generating process by comparing a value 707 as the computation result in the detection-computing circuit 706 with externally set threshold value $D_{th}$ (712).

Figure 8:
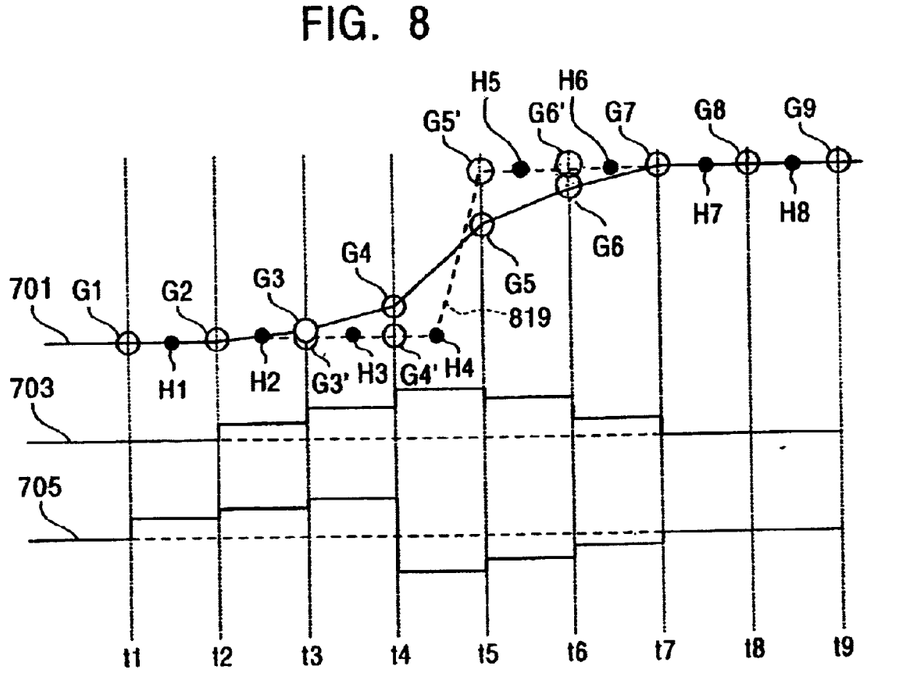
FIG. 8 is a signal-waveform chart illustrating an operation of a steep-contour generating process performed by the image display apparatus shown in FIG. 7.

FIG. 8 shows waveforms illustrating the operation of the image display apparatus when it performs the steep-contour generating process in accordance with the sequence shown in FIG. 2. FIG. 8 includes the waveform of the input video signal 701, data G1 to G9 of the input video signal, interpolation data H1 to H9, the waveform of the first differentiated signal 703 based on the input video signal 701, and the waveform of a second differentiated signal 705. It is assumed that data prior to the data G1 are identical to the data G1. It is also assumed that data after the data G1 are identical to the data G1. The input video signal 701 has a larger change in its waveform between the data G4 and the data G5 than between other data. The input video signal 701 has a larger change in its waveform between the data G5 and the data G6 than between the data G3 and the G4.

Data obtained after the steep-contour generating process are denoted by G3' to G6'.

When the data G1 is input, the output of a first differentiating circuit 702 is zero. Accordingly, the condition in step S1 is not satisfied in the determining-and-controlling circuit 708, which activates step S0.

When the data G2 is input, the data of the signal 703 output from the first differentiating circuit 702 has a discontinuous positive polarity. Thus, the condition in step S1 is not satisfied, and step S0 is accordingly activated.

When the data G3 is input, the data of the signal 703 output from the first differentiating circuit 702 has a positive polarity, and the condition in step S1 is satisfied in the determining-and-controlling circuit 708. The process proceeds to step S2. The data G3 is recognized as the start of the contour. In step S2, the condition is not satisfied since the second-differentiated value 705 remains to be positive. Accordingly, the process proceeds back to step S1.

When the data G4 is input, the data of the signal 703 output from the first differentiating circuit 702 has a positive polarity. Accordingly, the condition in step S1 is satisfied in the-determining-and-controlling circuit 708, and the process proceeds to step S2. In step S2, the polarity of the second-differentiated value 705 changes from positive to negative. Thus, the condition in step S2 is satisfied, and the process proceeds to step S3.

When the data G5 is input, the data of the signal 703 output from the first differentiating circuit 702 has a positive polarity. Thus, the condition in step S3 is not satisfied in the determining-and-controlling circuit 708. Accordingly, step S3 is continuously activated.

When the data G6 is input, the data of the signal 703 output from the first differentiating circuit 702 has a positive polarity. Thus, the condition in step S3 is satisfied in the determining-and-controlling circuit 708, but the condition s3a is not satisfied. Accordingly, step S3 is continuously activated.

When the data G7 is input, the data of the signal 703 output from the first differentiating circuit 702 is zero. Thus, the condition in step S3 is not satisfied in the determining-and-controlling circuit 708. Accordingly, the process proceeds to step S4, and the data G7 is recognized as the end of the contour.

In step S4 of the sequence by the determining-and-controlling circuit 708, the detection-computing circuit 706 performs detecting computation on the first-differentiated value 703 based on a range between the data G3, which is recognized as the start of the contour, and the data G7, which is recognized as the end of the contour. The detecting computation is performed identically to that in the first embodiment. When the computation result is greater than externally set threshold value $D_{th}$, the process proceeds to step S5.

In step S5, the computing circuit 710 performs the steep-contour generating process on the range between the data G3, which is recognized as the start of the contour, and the data G7, which is recognized as the end of the contour. A method of creating each data is described below.

Data H1 and H8 are positioned outside the contour. Accordingly, the data H1 and H8 are used as the average of original data adjacent to each interpolation data.

The data G3 and G4, and the data H2, H3, and H4, are treated so as to be identical to the data G2 just before the data G3 recognized as the start of the contour as indicated by G3 and G4. The data G5 and G6, and the data H5 and H6, are treated so as to be identical to the data G7 as indicated by G5 and G6.

A waveform obtained after the steep-contour generating process is indicated by the dotted line 819 shown in FIG. 8. The waveform is steeper than the original waveform, and represents a higher resolution than that by the original waveform.

Figure 9:
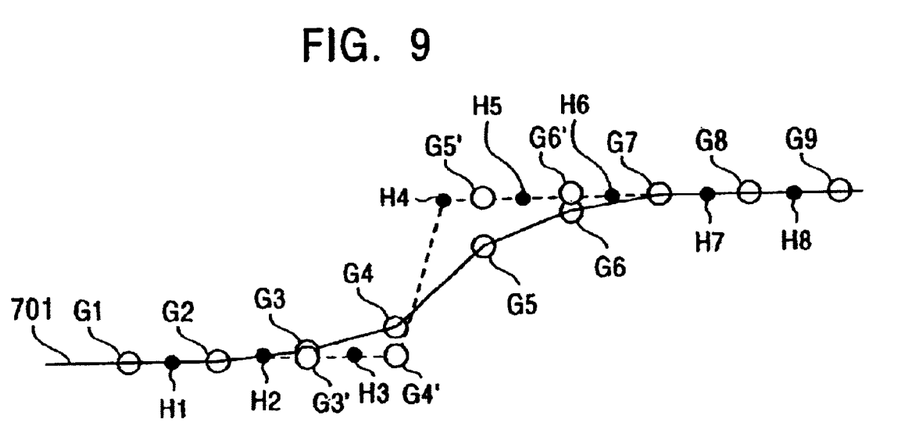
FIG. 9 is a signal-waveform chart illustrating another operation of the steep-contour generating process performed by the image display apparatus shown in FIG. 7.

In the third embodiment, the data G5 and G6 have a larger change than that in the data G3 and G4. However, this relationship is inverse, each interpolation data can be changed to be adapted for the waveform of the input video signal 701, such the use of the interpolation data H4 (shown in FIG. 9) as the data G7 recognized as the end of the contour.

As described in the second embodiment, the above-described method may be applied to the case where interpolation data are created using first-differentiated values based on data adjacent to the range detected as a steep contour.

In the foregoing embodiments, cases where an input video signal is processed so that its contour is steep have been described. In these cases, contour correction in the horizontal direction of the image is performed. However, the same correction may be performed in the vertical direction of the image.

What is claimed is:

1. An image display apparatus, comprising:
 a second differentiating circuit to compute a second-differentiated value based on an input video signal;
 a determining circuit to detect timing with which a polarity of the second-differentiated value obtained by said second differentiating circuit is inverted; and
 a computing circuit to perform a steep-contour generating process on an input video signal corresponding to the timing detected by said determining circuit such that a contour of said input video signal is steep,
 wherein said computing circuit performs computation for said steep-contour generating process by using said input video signal with said predetermined timing and the first-differentiated value based on an input video signal adjacent thereto.

2. An image display apparatus comprising:
 a second differentiating circuit to compute a second-differentiated value based on an input video signal;
 a determining circuit to detect timing with which a polarity of the second-differentiated value obtained by said second differentiating circuit is inverted; and
 a computing circuit to perform a steep-contour generating process on an input video signal corresponding to the timing detected by said determining circuit such that a contour of said input video signal is steep,
 wherein said computing circuit has a generating mechanism to generate, from said input video signal with said predetermined timing and first-differentiated values based on the input video signals adjacent to said input video signal with said predetermined timing, interpolation data between adjacent input video signals.

3. An image display apparatus according to claim 2, wherein said computing circuit has a controller to control, based on a change in the waveform of said input video signal, the generation of said interpolation data.

4. An image display apparatus, comprising:
 a first differentiating circuit to compute a first-differentiated value based on an input video signal;
 a second differentiating circuit to compute a second-differentiated value based on said input video signal;
 a detection-computing circuit to obtain a degree of a change in said input video signal with predetermined timing from a first-differentiated value based on an input video signal with said predetermined timing and a first-differentiated value based on at least one of input video signals adjacent to said input video signal with said predetermined timing;
 a determining circuit to detect timing with which a polarity of the second-differentiated value in said second differentiating circuit is inverted, and to determine, by referring to a computation result by said detection-computing circuit, which corresponds to said predetermined timing, a contour of said input video signal to be processed by a steep-contour generating process; and
 a computing circuit to perform, based on a determination result by said determining circuit, said steep-contour generating process on said input video signal.

5. An image display apparatus according to claim 4, wherein said detection-computing circuit has a division mechanism which uses, as a dividend, the first-differentiated value based on said input video signal with said predetermined timing and which uses, as a divisor, the first-differentiated value based on at said least one of input video signals adjacent to said input video signal with said predetermined timing.

6. An image display apparatus according to claim 4, wherein said detection-computing circuit has a subtraction mechanism which uses, as a minuend, the first-differentiated value based on said input video signal with said predetermined timing and which uses, as a subtrahend, the first-differentiated value based on said at least one of input video signals adjacent to said input video signal with said predetermined timing.

7. An image display apparatus according to claim 4, wherein said computing circuit performs computation for said steep-contour generating process by using said input video signal with said predetermined timing and the first-differentiated value based on said input video signals adjacent to said input video signal with said predetermined timing.

8. An image display apparatus according to claim 4, wherein said computing circuit has a generating mechanism to generate, from said input video signal with said predetermined timing and first-differentiated values based on the input video signals adjacent to said input video signal, interpolation data between the adjacent input video signals.

9. An image display apparatus according to claim 8, wherein said computing circuit has a controller to control, based on the change in the waveform of said input video signal, the generation of said interpolation data.

10. A contour detecting circuit, comprising:
 a first differentiating circuit to compute a first-differentiated value based on an input video signal;
 a second differentiating circuit to compute a second-differentiated value based on said input video signal;
 a detection-computing circuit to obtain a degree of a change in said input video signal with predetermined timing from a first-differentiated value based on said input video signal with said predetermined timing and a first-differentiated value based on at least one of input video signals adjacent to said input video signal with said predetermined timing; and
 a determining circuit to detect timing with which a polarity of the second-differentiated value by said second differentiating circuit is inverted, and to determine, by referring to a computation result by said detection-computing circuit, which corresponds to said predetermined timing, a contour of said input video signal.

11. A contour detecting circuit according to claim 10, wherein said detection-computing circuit has a division mechanism which uses, as a dividend, the first-differentiated value based on said input video signal with said predetermined timing and which uses, as a divisor, a first-differentiated value based on at least one of input video signals adjacent to said input video signal with said predetermined timing.

12. An image display apparatus according to claim 10, wherein said detection-computing circuit has a subtraction mechanism which uses, as a minuend, the first-differentiated value based on said input video signal with said predetermined timing, and which uses, as a subtrahend, the first-differentiated value based on said at least one of input video signals adjacent to said input video signal with said predetermined timing.

* * * * *